April 11, 1950  W. O. SCHULTZ  2,503,888
MULTIPLE STEP SWITCH
Filed Jan. 21, 1949  2 Sheets-Sheet 1

INVENTOR.
William O. Schultz
BY
Quenn R. Woolfolk
Attorney

April 11, 1950 W. O. SCHULTZ 2,503,888
MULTIPLE STEP SWITCH
Filed Jan. 21, 1949 2 Sheets-Sheet 2
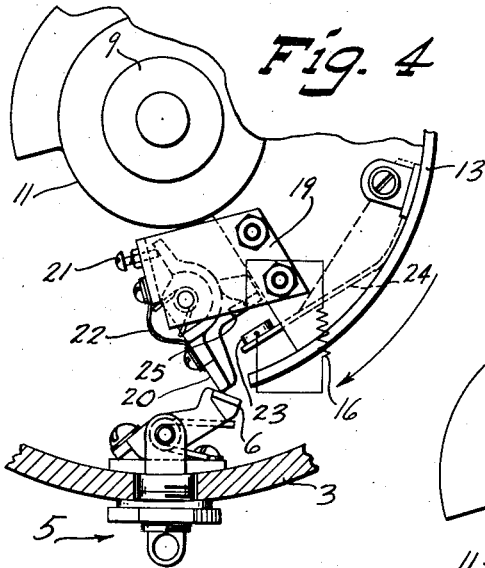
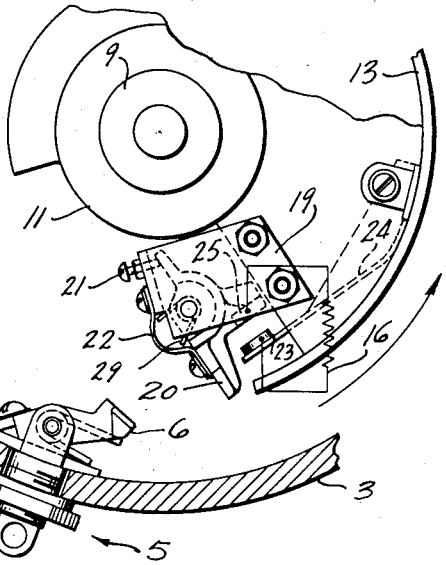
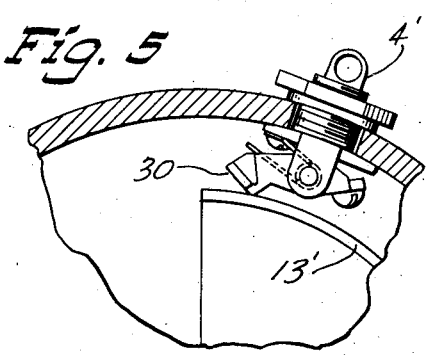
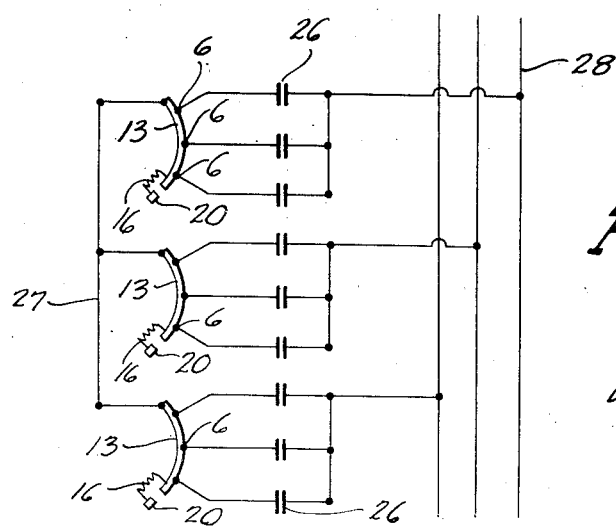
INVENTOR.
William O. Schultz
BY
Arthur R. Woolfolk
Attorney Patented Apr. 11, 1950

2,503,888

UNITED STATES PATENT OFFICE 2,503,888

MULTIPLE STEP SWITCH

William O. Schultz, Marshfield, Wis., assignor to McGraw Electric Company, a corporation of Delaware Application January 21, 1949, Serial No. 71,966

2 Claims. (Cl. 201—48)

This invention relates to a multiple step switch and is particularly directed to a multiple step switch which is designed to connect capacitors in a power line for power factor correction.

Objects of this invention are to provide a novel form of multiple step switch which is so made that it will prevent excessive rush of current when capacitors are connected to the power line, which has a quick break when the capacitors are successively disconnected from the line, and which has means for limiting the inrush of current during the connecting of the capacitors to the line and which also acts in a manner to assist in suppressing the final arc when the capacitors are successively disconnected from the line.

It has been found that when capacitors are disconnected from the line, there is frequently a tendency for the arc to persist as each capacitor is disconnected from the line, and a still more serious condition exists when capacitors are connected to the line. In view of the nature of the capacitors, it is apparent that when a substantially uncharged capacitor is connected to the power line there is normally a very severe inrush of current and this inrush becomes more severe as successive sections or banks of capacitors are connected into the line, for the previously charged capacitors will increase the current rush to the uncharged additional capacitors as they are successively connected to the line. These effects produce rapid burning away and wearing off of contacts, although the contacts are submerged in oil.

This invention is designed to overcome the above noted defects and objects of this invention are to provide an effective multiple step switch which limits the inrush of current in a marked manner when additional capacitors are successively connected to the power line, and which also greatly reduces the tendency of the arc to "hang" on or persist when the capacitors are successively disconnected from the line and to secure these results in a very simple manner by providing an impedance as a unitary structure with the rotary portion of the multiple step switch, and to so associate this impedance with a short-circuiting device that the impedance may be shorted out whenever necessary in an automatic manner and may be inserted during the connecting of capacitors into the line and may be again inserted at the instant that the capacitors are being disconnected from the line.

Embodiments of the invention are shown in the accompanying drawings, in which:

Figure 3 is a view corresponding to Figure 2 showing a successive position of the rotor just after that illustrated in Figure 2.

Figure 4 is a view showing the manner in which an auxiliary terminal assembly is initially connected to the main contact of the rotor with the impedance temporarily inserted.

Figure 5 is a fragmentary view showing a further form of the invention.

Figure 6 is a diagrammatic view showing the manner in which a multiple step switch may be employed to connect a bank of capacitors to a three phase power line.

Figure 1:
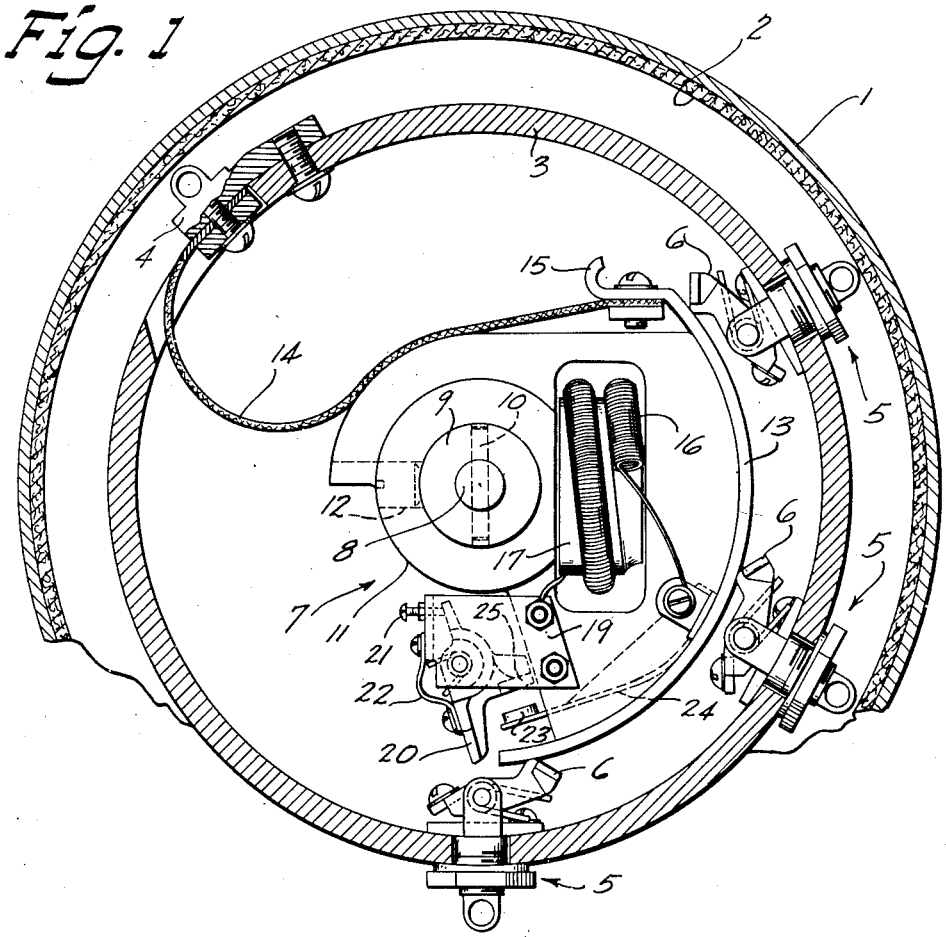
Figure 1 is a fragmentary, sectional view of a multiple step switch.

Referring to the drawings, it will be seen that the multiple step switch is enclosed in a cylindrical housing 1 which is provided with an internal, insulating sheath 2 and with an insulating, cylindrical supporting portion 3. This insulating supporting portion 3 carries a main terminal 4 and a plurality of auxiliary terminal assemblies 5, each of the latter including a resiliently mounted contact or switch arm 6 which is spring pressed towards the rotor indicated generally by the reference character 7, the rotor 7 being rigidly carried by a metal shaft 8. If desired, three sections of the switch may be employed, one only having been shown in Figure 1. The three sections of the switch are employed when a three phase power line is to have power factor correction. The shaft 8 is driven in any suitable manner by means of an automatically controlled motor mechanism, which latter is well known in the art, and is not illustrated.

The shaft is provided with an insulating sleeve 9 which is secured rigidly to the shaft by means of a metal pin 10. The rotor consists of an insulating cylinder block or main portion 11 which is secured to the insulating sleeve 9 by means of a set screw 12. This main insulating block or main body portion of the rotor is provided with a contact rail or main extended contact 13 which is connected by means of a flexible conducting leader or ribbon 14 with the main terminal 4, the end of the contact rail 13 being preferably rounded as indicated at 15 to avoid damaging the flexible ribbon 14 when the rotor is rotated in a counterclockwise direction as viewed in Figure 1.

The rotor is provided with an impedance indicated at 16 which may take the form of a wire resistor which in turn may be carried by an insulating, grooved spool 17. The impedance which in the form shown for the resistor 16, forms a unitary portion of the rotor as is apparent from an examination of Figure 1. One end of the resistor or impedance 16 is connected directly to the main circular or arcuate contact 13 and the other end of the impedance 16 is connected to a metal bracket 19. This metal bracket is provided with an auxiliary rotor contact or switch arm 20 which is spring pressed in a counterclockwise direction as viewed in Figure 1 and which is pivotally carried by the bracket 19. An adjustable stop 21 is provided for limiting the counterclockwise rotation of the auxiliary rotor contact 20 and preferably a flexible conducting leader or ribbon 22 is connected between the metal bracket 19 and the auxiliary rotor contact or auxiliary rotor switch arm 20.

Figure 2:
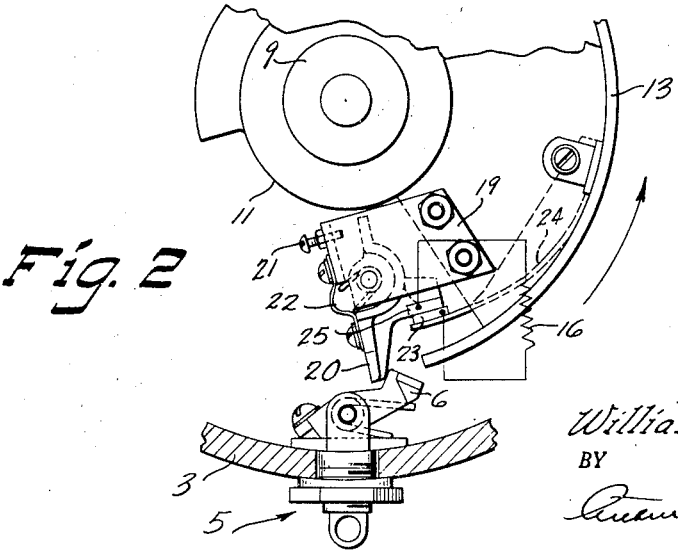
Figure 2 is a fragmentary view showing the position of the parts as the rotor is moving towards disconnecting position with reference to one of the auxiliary terminal assemblies.

A contact 23 is carried by a spring arm 24 electrically connected to the main rotor contact 13 and is adapted to be engaged by a contact 25 carried by a projection of the switch arm 20 when the switch arm 20 is rocked in a clockwise direction, to the position shown, for instance, in Figure 2. These contacts 25 and 23 are designed to short-circuit the impedance 16 when such contacts are in engagement with each other as is obvious from an inspection of Figure 2.

From reference to Figure 6, it will be seen that the auxiliary terminals 5 or terminal assemblies are designed to be connected to a plurality of capacitors 26 and the main rotor contact 13 is designed to be connected at a neutral point 27 for a three phase system for instance.

It is apparent that as the rotor is moved from the position shown in Figure 1 in a counterclockwise direction, that one or more of the capacitors or capacitor banks will be cut out or disconnected from the power line indicated generally by the reference character 28. If it is desired to disconnect one of the capacitors of each set from the power line, the rotor is moved in a counterclockwise direction so as to disconnect the main stationary terminal 4 from the last auxiliary terminal assembly 5 as viewed in Figure 1. As the rotor moves in a counterclockwise direction the auxiliary contact arm 6 will pass from the main rotor contact 13 and will engage the auxiliary rotor contact or switch arm 20 and continued rotation of the rotor will short out the resistor 16, as shown in Figure 2. Thus the resistor is not called upon to carry current for any material length of time during this disconnecting operation. Continued rotation of the rotor will cause the auxiliary rotor contact or switch arm 20 to move away from the auxiliary switch arm or contact 6 of the auxiliary contact assembly 5 as shown, for instance, in Figure 3, and this disconnection will occur with a snap action due to the spring 29 of the auxiliary rotor contact 20 which causes the rotor contact 20 to rock in a counterclockwise direction to the position shown in Figure 3. This motion of the auxiliary rotor contact 20 immediately reinserts the resistor 16 and materially assists in suppressing any arc that may tend to persist at this final break. Further, it is to be noted that the break is a quick break as will be obvious from a comparison of Figures 2 and 3. Under these conditions there is very little wear on the contact arms of the stationary auxiliary contacts or of the rotor contacts. The contact arms as well as the main contact are made of high arc resisting metal of any suitable type so as to materially prolong the life of the device and all of the contacts are arranged to operate submerged in oil in accordance with the usual practice.

It is to be noted upon examination of Figure 4, for instance, that when the rotor is rotated in a clockwise direction to connect a capacitor to the power line, that the first contact is made between the auxiliary rotor contact or rotor switch arm 20 and the corresponding auxiliary terminal switch arm 6 with the resistor 16 connected between the main contact 13 of the rotor and the auxiliary rotor contact 20. This resistor limits the inrush of current which is very pronounced under normal conditions and which would rapidly destroy the contact or switch arms in the absence of the impedance or resistor 16. This impedance limits the inrush of current to a safe value which will not damage the switch arms. It is apparent that as more and more capacitors are connected to the power line that the inrush current condition becomes more and more severe as the charged capacitors tend to greatly increase the current rush to the uncharged new capacitor that is being connected to the power line. However, the resistor 16 is so chosen as to hold the current value down to such a point that no material damage is done to the contact arms even under the most adverse conditions as hereinabove pointed out. Continued motion of the rotor directly connects the auxiliary switch arm 6 to the main rotor contact 13 as shown in Figure 1.

In the modified form of the invention shown in Figure 5, the flexible leader 14 of Figure 1 is dispensed with and instead the main terminal 4' is permanently connected with the main rotor contact 13' by means of a main resiliently mounted switch arm 30.

It will be seen that a novel form of multiple step switch has been provided which is highly successful even when used under the severe conditions of connecting capacitors to a high tension power line for power factor correction.

It will be seen further that the multiple step switch, though having this desirable characteristic, is nevertheless of simple construction and may be safely and readily produced.

Although this invention has been described in considerable detail, it is to be understood that such description is intended as illustrative rather than limiting, as the invention may be variously embodied and is to be interpreted as claimed.

I claim:

1. A multiple step switch comprising a main terminal, a plurality of auxiliary terminal assemblies, a rotor, an extended main rotor contact arranged to successively engage and disengage said auxiliary terminal assemblies as said rotor is rotated in switch closing and switch opening directions, respectively, and being connected to said main terminal, a movable auxiliary rotor contact carried by said rotor, an impedance connected between said main and auxiliary rotor contacts, said auxiliary rotor contact being positioned in trailing relation to said main rotor contact when said rotor is moving towards switch opening position and being arranged to temporarily engage an auxiliary terminal assembly after said main rotor contact has become disengaged therefrom, and by-pass switch means controlled by said auxiliary rotor contact for temporarily by-passing said impedance and for removing the by-pass when said auxiliary rotor contact moves away from the last mentioned auxiliary terminal assembly.

2. A multiple step switch comprising a main terminal, a plurality of auxiliary terminal assemblies, a rotor, an extended main rotor contact arranged to successively engage and disengage said auxiliary terminal assemblies as said rotor is rotated in switch closing and switch opening directions, respectively, and being connected to said main terminal, a movable auxiliary rotor contact carried by said rotor, an impedance connected between said main and auxiliary rotor contacts, said auxiliary rotor contact being positioned in trailing relation to said main rotor contact when said rotor is moving towards switch opening position and being arranged to temporarily engage an auxiliary terminal assembly after said main rotor contact has become disengaged therefrom, and by-pass switch means controlled by said auxiliary rotor contact for temporarily by-passing said impedance and for removing the by-pass when said auxiliary rotor contact moves away from the last mentioned auxiliary terminal assembly, said auxiliary rotor contact being spring biased and having a quick break with reference to said auxiliary terminal assemblies.

WILLIAM O. SCHULTZ.

REFERENCES CITED

The following references are of record in the file of this patent:

UNITED STATES PATENTS

| Number | Name | Date |
| --- | --- | --- |
| 516,379 | Muller | Mar. 13, 1894 |
| 835,416 | Gough | Nov. 6, 1906 |
| 1,005,084 | Thomas | Oct. 3, 1911 |

FOREIGN PATENTS

| Number | Country | Date |
| --- | --- | --- |
| 423,390 | Germany | Jan. 6, 1926 |